United States Patent [19]

Smith et al.

[11] Patent Number: 4,694,057
[45] Date of Patent: Sep. 15, 1987

[54] PREPARATION OF POLYMERS CONTAINING PENDANT ISOCYANATE GROUPS AND DERIVATIVES THEREOF BY EMULSION COPOLYMERIZATION

[75] Inventors: Robert A. Smith, Uniontown; Dane K. Parker, Massillon; Howard A. Colvin, Akron; Arthur H. Weinstein, Hudson; Dennis B. Patterson, Akron, all of Ohio

[73] Assignee: The Goodyear Tire & Rubber Company, Akron, Ohio

[21] Appl. No.: 708,840

[22] Filed: Mar. 6, 1985

[51] Int. Cl.$^4$ ............................................. C08F 2/22
[52] U.S. Cl. ................................. 526/206; 526/310; 526/223
[58] Field of Search ................. 526/301, 310, 206, 223

[56] References Cited

U.S. PATENT DOCUMENTS

| | | | |
|---|---|---|---|
| 2,326,287 | 8/1943 | Coffman | 526/310 |
| 2,468,713 | 4/1949 | Kropa et al. | 260/453 |
| 3,502,475 | 3/1970 | Kane | 526/312 |
| 3,551,390 | 12/1970 | Krimm | 526/301 |
| 4,180,638 | 12/1979 | Dollhausen et al. | 526/223 |
| 4,556,702 | 12/1985 | Schaefer | 526/88 |

FOREIGN PATENT DOCUMENTS 0130322  1/1985  European Pat. Off. .

Primary Examiner—Joseph L. Schofer
Assistant Examiner—Peter F. Kulkosky
Attorney, Agent, or Firm—Alvin T. Rockhill

[57] ABSTRACT

It has unexpectedly been discovered that 1-(1-isocyanato-1-methylethyl)-3-(1-methylethenyl) benzene(m-TMI) can be emulsion copolymerized with other monomers into useful polymers. For example, it has been found that m-TMI can be emulsion copolymerized with diene monomers to produce polymers which contain pendant isocyanate groups. Such pendant isocyanate groups are useful in a variety of applications. For instance, such pendant isocyanate groups can be utilized as sites to which chemical agents, such as antidegradants, can be bound to the polymer. Elastomers which contain such pendant isocyanate groups are of value since they can be crosslinked without employing sulfur. Elastomers of this type which contain pendant isocyanate groups can also potentially be thermo-reversibly crosslinked.

23 Claims, No Drawings

PREPARATION OF POLYMERS CONTAINING PENDANT ISOCYANATE GROUPS AND DERIVATIVES THEREOF BY EMULSION COPOLYMERIZATION

BACKGROUND OF THE INVENTION

It is well known that isocyanates readily react with water. In fact, the hydrolysis of isocyanates which can be catalyzed by either acids or bases is disclosed in organic chemistry textbooks such as J. March; Advanced Organic Chemistry: Reactions, Mechanisms and Structure; page 658; 1968. The hydrolysis of isocyanates results in the formation of primary amines and carbon dioxide, as is shown below.

Since isocyanate groups readily react with water, the emulsion polymerization of monomers containing isocyanate groups is not normally considered. For instance, U.S. Pat. No. 4,429,096 discloses a process wherein the isocyanate group on meta-TMI is "blocked" with a cationic carbamate structure and then polymerized into a polymer. The cationic carbamate structure can then be eliminated thermally to regenerate the isocyanate group which was blocked during the polymerization process.

SUMMARY OF THE INVENTION

The present invention discloses a process wherein TMI can be emulsion or suspension copolymerized with other ethylenically unsaturated monomers into polymers without the necessity to "block" the isocyanate groups on the TMI. This process more specifically entails the polymerization of TMI into TMI containing copolymers wherein the polymerization is carried out in an aqueous medium comprising (a) TMI, (b) at least one additional ethylenically unsaturated monomer, (c) a free radical initiator system, and (d) water. Optionally, the aqueous medium may further contain a surfactant (emulsifier).

The present invention also reveals a process for the emulsion copolymerization of TMI with diene monomers wherein said emulsion copolymerization is carried out in an aqueous medium comprising (a) TMI, (b) at least one diene monomer, (c) an emulsifier, (d) a redox initiator system, (e) a brominated hydrocarbon chain transfer agent, and (f) water. The present invention further discloses a process for the emulsion copolymerization of TMI with diene monomers into TMI containing copolymers wherein said emulsion copolymerization is carried out in an aqueous medium comprising (a) TMI, (b) at least one diene monomer, (c) an emulsifier, (d) a redox initiator system, (e) diisopropylxanthogen disulfide, and (f) water.

The process of the present invention is very useful because it can be used in the preparation of elastomers which can be crosslinked (cured) without using sulfur. Elastomers of this type can also potentially be thermoreversibly crosslinked. Such an elastomeric composition is comprised of repeat units which are derived from TMI and at least one diene monomer. The present invention further discloses a crosslinked elastomeric composition which is comprised of polymeric chains which are derived from TMI and at least one diene monomer wherein said polymeric chains are crosslinked with at least one difunctional or polyfunctional active hydrogen compound, such as a diamine, a dihydroxyalcohol, or a dimercaptan.

DETAILED DESCRIPTION OF THE INVENTION

It has been unexpectedly found that 1-(1-isocyanato-1-methylethyl)-3-(1-methylethenyl) benzene (TMI) can be polymerized into polymers in aqueous systems utilizing either emulsion or suspension polymerization techniques. m-TMI has the structural formula:

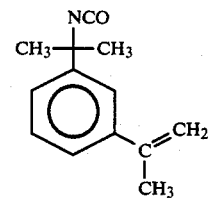

Such a polymerization is conducted in an aqueous medium comprising: the TMI, at least one additional ethylenically unsaturated monomer, a free radical initiator system, water, and optionally a surfactant (soap).

Normally either meta-TMI or para-TMI will be utilized in the polymerization of this invention. However, meta-TMI is more readily available commercially and is preferred for use.

The ethylenically unsaturated monomers that can be emulsion copolymerized with TMI contain at least one nonaromatic double bond. These ethylenically unsaturated monomers are generally diene monomers or vinyl monomers. The ethylenically unsaturated monomers utilized in the practice of this invention generally contain from 2 to 16 carbon atoms. Some representative examples of ethylenically unsaturated monomers that can be utilized in the emulsion polymerizations of this invention include diene monomers such as butadiene, isoprene, piperylene, chloroprene, and the like; alkyl acrylates, such as methyl acrylate, ethyl acrylate, butyl acrylate, methyl methacrylate and the like; vinyl aromatics such as styrene, α-methylstyrene, bromostyrene, chlorostyrene, fluorostyrene, vinylanisole, and the like; vinyl halides, such as vinylbromide, chloroethene (vinyl chloride), 1,1-dichloroethylene (vinylidene chloride), and the like: vinyl esters such as vinyl acetate; α,β-olefinically unsaturated nitriles, such as acrylonitrile and methacrylonitrile; α,β-olefinically unsaturated amides, such as acrylamide, N-methyl acrylamide, N-t-butyl acrylamide, N-cyclohexyl acrylamide, diacetone acrylamide, methacrylamide, N-ethyl methacrylamide, and the like; vinyl pyridine; methacrylates, such as n-octyl methacrylate and dodecyl methacrylate; hydroxyethylacrylate; polyfunctional compounds such as ethylene glycol dimethacrylate, diethylene glycol diacrylate, divinyl benzene, alkenyl pentaerythritol, methylene-bis-acrylamide, and the like.

In the polymerization of TMI monomer with one or more of the above-mentioned ethylenically unsaturated monomers there can be competing or side reactions which take place. Therefore, the choice of reactants, process conditions, the order of addition of reactants and the like should be selected in order to produce a useful polymer containing chain linkages (repeat units) which are derived from TMI. Generally, the ethylenically unsaturated monomers utilized will not contain amine groups or mercaptan groups because the isocyanate group on the TMI monomer can react with amines and mercaptans.

The emulsifiers or soaps used in the emulsion copolymerizations of this invention may be charged at the outset of the polymerization or may be added incrementally or by proportioning as the reaction proceeds. Generally, anionic emulsifier systems provide good results; however, any of the general types of anionic, cationic or nonionic emulsifiers may be employed in the polymerization.

Among the anionic emulsifiers that can be employed in the emulsion copolymerizations of this invention are fatty acids and their alkali metal soaps such as caprylic acid, capric acid, pelargonic acid, lauric acid, undecylic acid, myristic acid, palmitic acid, margarmic acid, stearic acid, arachidic acid, and the like; amine soaps of fatty acids such as those formed from ammonia, mono- and dialkyl amines, substituted hydrazines, guanidine, and various low molecular weight diamines; chain-substituted derivatives of fatty acids such as those having alkyl substituents; napthenic acids and their soaps and the like; sulfuric esters and their salts, such as the tallow alcohol sulfates, coconut alcohol sulfates, fatty alcohol sulfates, such as oleyl sulfate, sodium lauryl sulfate and the like; sterol sulfates; sulfates of alkylcyclohexanols, sulfation products of lower polymers of ethylene as $C_{10}$ to $C_{20}$ straight chain olefins, and other hydrocarbon mixtures, sulfuric esters of aliphatic and aromatic alcohols having intermediate linkages, such as ether, ester, or amide groups such as alkylbenzyl (polyethyleneoxy) alcohols, the sodium salt of tridecyl ether sulfate, alkane sulfonates, esters and salts, such as alkylsulfonic acids with the general formula $RSO_2$—OH, wherein R is an alkyl group having from 1 to 20 carbon atoms; sulfonates with intermediate linkages such as ester and ester-linked sulfonates such as those having the formula $RCOOC_2H_4SO_3H$ and $RCOOC$—$CH_2$—$SO_3H$, wherein R is an alkyl group having from 1 to 20 carbon atoms such as dialkyl sulfosuccinates; ester salts with the general formula:

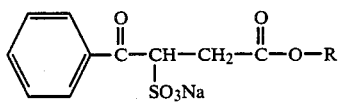

wherein R is an alkyl group having from 1 to 20 carbon atoms; aralkyl sulfonates in which the alkyl groups contain preferably from 10 to 20 carbon atoms, e.g. dodecylbenzenesulfonates, such as sodium dodecylbenzenesulfonate; alkyl phenol sulfonates; sulfonic acids and their salts such as acids with the formula $RSO_3Na$, wherein R is an alkyl and the like; sulfonamides, sulfamido methylenesulfonic acids; rosin acids and their soaps; sulfonated derivatives of rosin and rosin oil; and lignin sulfonates, and the like. Of rosin acids, about 90 percent are isomeric with abietic acid and the other 10 percent is a mixture of dehydro abietic acid and dehydro abietic acid.

The emulsion copolymerizations of this invention are initiated with free radical initiator systems. Normally, the polymerization is initiated by the addition of such a free radical initiator system to a mixture of TMI, the additional ethylenically unsaturated monomers, the emulsifier, and water which forms an aqueous reaction medium.

Some representative examples of free radical initiators which are commonly used include the various peroxygen compounds such as potassium persulfate, ammonium persulfate, dicetyl peroxydicarbonate, the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like.

Numerous redox initiator systems can also be employed as the free radical initiator in order to initiate the emulsion copolymerization of TMI with ethylenically unsaturated monomers. For example, such polymerizations can be initiated by utilizing ferrous/hydroperoxide redox initiators, metal persulfate/sodium metabisulfite redox initiators, $Cu^{2+}$/peroxydiphosphate redox initiators. $KMnO_4$/glucose redox initiators, and $Cu^{3+}$/hydroperoxide redox initiators. Potassium persulfate and ammonium persulfate can be used with great success as redox initiators when used in conjunction with sodium metabisulfite. Various metal persulfates (for example sodium and potassium) and ammonium persulfate (hereinafter the term metal persulfates will be meant to include ammonium persulfate) can be employed as redox initiators when used in conjunction with sodium metabisulfite, sodium thiosulfate, and sodium dithionite. Ferrous/hydroperoxide redox initiator systems are comprised of a ferrous compound which contains a divalent iron atom ($Fe^{2+}$) and a hydroperoxide compound which contains a —OOH group. Some representative examples of ferrous compounds that can be used in the redox initiator systems of this invention include ferrous ammonium gluconate, ferrous bromide, ferrous carbonate, ferrous chloride, ferrous fluoride, ferrous fluosilicate, ferrous hyposulfite, ferrous iodide, ferrous nitrate, ferrous oxalate, ferrous perchlorate, ferrous sulfate, ferrous tartrate, and ferrous thiocyanate. Some representative examples of hydroperoxide compounds that can be utilized include 2,3-dimethylbutane hydroperoxide, methylcyclohexane hydroperoxide, cumene hydroperoxide, 2,2,5-trimethylhexane hydroperoxide, 1,2,3,4-tetrahydronaphthalene hydroperoxide, sec-butylbenzene hydroperoxide, p-cymene hydroperoxide, aliphatic alkylate hydroperoxide, 1-methyl-1,2,3,4-tetrahydronaphthalene hydroperoxide, 5-phenylpentene-Z-hydroperoxide, chloroisopropylbenzene hydroperoxide, cyclohexylbenzene hydroperoxide, diisopropylbenzene hydroperoxide, isopropyl-1,3,3,4-tetrahydronaphthalene hydroperoxide, t-butylisopropylbenzene hydroperoxide, diisopropyltoluene hydroperoxide, 1,2,3,4,4a,9,20,10a-octahydrophenanthrene hydroperoxide, 5-(4-isopropylphenyl-2-pentene hydroperoxide, (1-methylbutyl)-isopropylbenzene hydroperoxide, chlorodiisopropylbenzene hydroperoxide, triisopropylbenzene hydroperoxide, 1,2-diphenylbutane hydroperoxide, di-t-butylisopropylbenzene hydroperoxide, (1-methylhendecyl)-toluene hydroperoxide, 1,2-bis-(dimethylphenyl)-butane hydroperoxide, and (1-methylhendecyl)-isopropylbenzene hydroperoxide. The most preferred hydroperoxide compounds are 2,3-dimethylbutane hydroperoxide, cumene hydroperoxide, sec-butylene hydroperoxide, p-cymene hydroperoxide, and paramenthane hydroperoxide.

These redox initiator components can be employed at levels from about 0.0001 weight percent to about 0.05 weight percent based upon the total weight of the aqueous reaction medium. It is generally preferred for the initiator components to be employed at levels from about 0.0005 weight percent to 0.01 weight percent based upon the total weight of the aqueous reaction medium. The most preferred level for the initiator components is from 0.001 weight percent to 0.005 weight percent based upon the total aqueous reaction medium.

The temperature range over which the polymerizations of this invention can be conducted is from about −20° C. to about 60° C. The preferred temperature range is from −5° C. to 40° C. with the most preferred temperature being from 5° C. to 30° C. The reaction time allowed for the polymerization to occur (time period between the initiation of the polymerization and its termination) is generally in the range of about 0.5 to 50 hours. However, in most cases a reaction time of 8 to 16 hours can be employed. This reaction time will vary with the temperature at which the polymerization is conducted, with the type of redox initiator system employed, and with the level of initiator used.

It is sometimes desirable to use deionized water in the preparation of the aqueous reaction medium used in the polymerizations of this invention. For best results oxygen which is dissolved in the water and monomers should be removed before polymerization. This can be accomplished by sparging the monomers and water used in the reaction medium with an inert gas or nitrogen.

The aqueous reaction medium will normally contain from about 40 weight percent to about 95 weight percent water, from about 5 weight percent to about 60 weight percent monomers (including TMI), and from about 0.1 weight percent to about 10 weight percent emulsifiers, based upon the total weight of the aqueous reaction medium. Preferably, the aqueous reaction medium will contain 50 to 90 weight percent water, 10 to 50 weight percent monomers, and 0.3 to 5 weight percent soaps. More preferably, the aqueous reaction medium will contain 60 to 80 weight percent water, 20 to 40 weight percent monomers, and 0.5 to 2 weight percent emulsifiers.

The monomer component of the aqueous reaction medium will normally contain from about 0.5 to about 50 weight percent TMI and from about 50 weight percent to about 99.5 weight percent ethylenically unsaturated monomers. Preferably, the monomer component of the aqueous reaction medium will be comprised of from 1 to 30 weight percent TMI and from 70 to 99 weight percent ethylenically unsaturated monomers.

The polymerization of m-TMI into copolymers results in the copolymer formed containing repeat units having the structural formula:

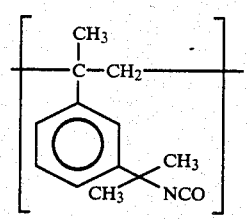

which are derived from the m-TMI. The repeat units derived from TMI differ from TMI in that they no longer contain a carbon-carbon double bond. In fact, the polymerizations that have herein been described consume a carbon-carbon double bond on each of the monomers incorporated into the polymer as a repeat unit. For example, a copolymer of styrene and TMI has the structural formula:

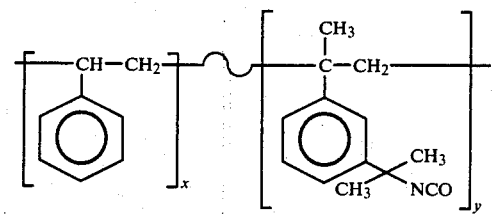

wherein x and y are integers and wherein

indicates that the distribution of chain linkages derived from TMI and styrene can be random.

Copolymerization of TMI with Dienes

TMI can be emulsion copolymerized with numerous diene monomers to produce elastomeric polymers having a low degree of intermolecular crosslinking with gel contents of less than 5 percent by weight. The gel content of a given polymer is the percentage of that polymer by weight which can be held up by a 100 mesh screen (the percentage of a polymer that does not pass through a 100 mesh screen). The aqueous reaction mediums utilized in these emulsion copolymerizations are comprised of the TMI, at least one diene monomer, an emulsifier, a redox initiator system, a chain transfer agent, and water. It is necessary to utilize a chain transfer agent in such polymerizations utilizing significant amounts of diene monomers in order to moderate molecular weight and to limit gel formation. However, the selection of an appropriate chain transfer agent is not a simple task. This is because most of the chain transfer agents commonly used in emulsion polymerizations of diene monomers are ineffective in controlling the molecular weight and limiting gel formation in emulsion copolymerizations of diene monomers with TMI. For example, mercaptan chain transfer agents have been found to be ineffective for controlling gel formation in terpolymers of butadiene, styrene, and m-TMI. The inability of mercaptan chain transfer agents to control the molecular weight of TMI containing copolymers is believed to be due to a reaction between the mercaptan and the isocyanate group on the TMI.

It has been determined that diisopropylxanthogen disulfide (DIXIE) can be effectively used as a chain transfer agent in the emulsion copolymerization of TMI with diene monomers. It has also been determined that brominated hydrocarbon chain transfer agents can also be utilized in such polymerizations. The brominated hydrocarbons that can be utilized as chain transfer agents normally contain from 1 to 20 carbon atoms and are very highly bromosubstituted. These brominated Z0 hydrocarbon chain transfer agents will normally contain at least one carbon atom which is bonded to at least 2 bromine atoms. Some representatives examples of brominated hydrocarbon chain transfer agents include carbon tetrabromide, bromoform and hexabromoethane. The amount of chain transfer agent utilized in the aqueous reaction medium will generally range between 0.00001 and 0.5 weight percent based upon the total weight of the aqueous reaction medium. It will generally be preferred for the aqueous reaction medium to contain from 0.01 to 0.3 weight percent of the chain transfer agent.

The reaction mediums utilized in synthesizing copolymers of TMI and diene monomers are very much like those used in the synthesis of other types of TMI copolymers except for the fact that they also contain a chain transfer agent and, of course, one or more diene monomers. Additionally, a redox initiator system must be used as the free radical initiator in copolymerizations of TMI and diene monomers in order to prevent gel formation. In some copolymerizations of TMI with diene monomers it will be highly desirable to add the redox initiator incrementally throughout the polymerization. For example, in copolymerizations of TMI, butadiene, and styrene, the incremental addition of a redox initiator during the polymerization is required in order to achieve high conversions. However, incremental initiator addition is generally not required in copolymerizations of TMI, butadiene, and acrylonitrile in order to get high conversions. Such systems can be treated at the desired degree of conversion with short-stopping agents, such as hydroquinone, in order to terminate the polymerization. Typical stabilizing agents and standard antioxidants can also generally be added to the reaction medium without interfering with the polymerization. Copolymers of TMI with diene monomers will normally contain at least about 50 weight percent diene monomers, based upon the total repeat units in the polymer. Thus, the aqueous reaction mediums utilized in such polymerizations will normally contain at least 50 weight percent diene monomers, based upon the total monomers in the aqueous medium. Additional ethylenically unsaturated monomers, such as vinyl aromatic monomers, can also be polymerized into such polymers which contain TMI and one or more diene monomers. Terpolymers of this type which contain TMI, one or more diene monomers, and one or more ethylenically unsaturated monomers in addition to the TMI and the diene monomers will also normally contain at least 50 weight percent diene monomers based upon the total repeat units in the polymer.

Copolymers and terpolymers of TMI with diene monomers will generally contain at least about 1 weight percent TMI. Thus, polymers of this type will contain from about 50 weight percent to about 99 weight percent diene monomers and from about 1 weight percent to about 50 weight percent TMI. Copolymers of TMI and diene monomers will commonly contain from about 70 to 98 weight percent diene monomers and from 2 to 30 weight percent TMI. Terpolymers of TMI, diene monomers, and vinyl aromatic monomers can contain widely varying amounts of the three types of monomers of which they are composed. However, such terpolymers will commonly contain from 50 to 90 weight percent diene monomers, from 1 to 30 weight percent TMI, and from 1 to 40 weight percent vinyl aromatic monomers. The precise ratio of the various types of monomers incorporated into such polymers will depend upon the final properties which are desired for the polymer being synthesized. Terpolymers which contain from 60 to 80 weight percent diene monomers, from 3 to 10 weight percent TMI, and from 20 to 30 weight percent vinyl aromatic monomers are useful in many applications.

After the emulsion polymerization has been completed, most conventional coagulating techniques can be employed. However, a coagulation technique should be chosen which preserves the specific functional moieties on the polymer synthesized. Coagulation with an acid or blends of salts with acids is usually very satisfactory. For example, sulfuric acid, hydrochloric acid, blends of sodium chloride with sulfuric acid, and blends of hydrochloric acids with methanol are very effective as coagulating agents. Calcium chloride, magnesium sulfate, or aluminum sulfate solutions can also be used as coagulants with good results.

It will often be desirable to graft one or more chemical agents, such as accelerators, ultraviolet light stabilizers, antioxidants, antistats, bacteriostats, flame retardants, fungicides and deodorants to TMI containing copolymers. The pendant isocyanate groups on TMI containing copolymers are convenient sites to which such chemical agents can be bound to the polymer. Normally, this grafting of chemical agents to TMI containing copolymers will be done while the polymer is in latex form (in an aqueous emulsion). In other words, the grafting of chemical agents onto TMI containing copolymers is usually done after the emulsion polymerization used to synthesize the polymer has been completed and before the polymer is coagulated from the latex.

The chemical agents which can be grafted to TMI containing copolymers will contain at least one active hydrogen atom which is capable of reacting with the pendant isocyanate groups on the TMI containing copolymers. Compounds which are capable of reacting with isocyanate groups (active hydrogen compounds) are discussed in more detail by Reinhard Richter and Henri Ulrich in *Chemistry of Cyanates and their Thio Derivatives* which is hereby incorporated by reference in its entirety. Chemical agents which are active hydrogen compounds can often be grafted onto a TMI containing copolymer simply adding them in a suitable dispersed form to an aqueous emulsion of that TMI containing copolymer. However, in some cases it may be desirable to utilize elevated temperatures and/or a catalyst, such as dibutyl tin dilaurate, in order to facilitate the reaction between the chemical agent and the isocyanate groups on the TMI containing copolymer. The amount of a chemical agent added will depend upon the amount of the agent that it is desired to graft to the TMI containing copolymer.

Chemical agents which contain amine groups or mercaptan groups will readily react with the pendant isocyanate groups on TMI containing copolymers and can therefore be easily grafted to such TMI containing copolymers. In fact, chemical agents which contain amine groups or mercaptan groups can generally be grafted onto such polymers without the need for utilizing any catalysts or elevated temperatures. Chemical agents which contain hydroxy groups are also active hydrogen compounds and can also be easily grafted to TMI containing copolymers. However, it will often be necessary to utilize a catalyst and/or heat in order to promote the reaction between the hydroxy group or the carboxyl group on the chemical agent and the isocyanate group on the TMI containing copolymers.

Some representative examples of antioxidants that can be grafted onto TMI containing copolymers include p-amino diphenylamine, N-4-(anilinophenyl)-mercapto acetamide (MADA), and di-t-butyl hydroquinone. The grafting of MADA onto a TMI containing copolymer is achieved by the reaction of the mercaptan group (—HS) on the MADA with a pendant isocyanate group on a repeat unit in the polymer chain which was derived from TMI. The repeat units which react with MADA and thus which have MADA grafted to them have the structure

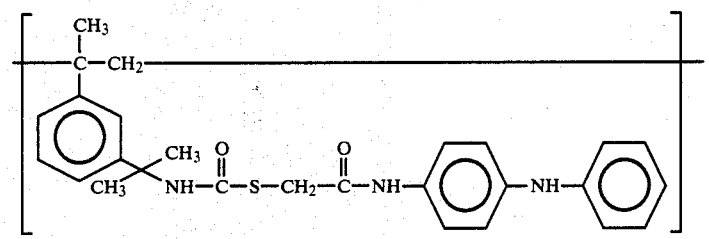

and provide the polymer with antioxidant protection.

After grafting any desired active hydrogen atom containing chemical agents to the TMI containing polymer and before coagulation, it may be desirable to block any unreacted isocyanate groups in the polymer. This is because unreacted isocyanate groups in the polymer can react so as to cause undesired crosslinking which ultimately results in the formation of an insoluble polymer. Secondary amines have been found to be very useful for blocking unreacted isocyanate groups in TMI containing copolymers. For example, dialkyl amines can be added to the latex of a TMI containing copolymer in at least a stoichiometric amount calculated to block all of the unreacted isocyanate groups. Such secondary dialkyl amines normally contain from 2 to 20 carbon atoms. Some representative examples of dialkyl amines that can be utilized to block unreacted isocyanate groups include diethyl amine, dipropyl amine, and dibutyl amine.

After coagulation, washing can be employed to remove excess soap and/or electrolyte from the TMI containing polymer. Sometimes washing is also useful in adjusting the pH of the polymer that has been synthesized. After washing, if it is desired, the copolymer can be dewatered. If it is desirable to do so, the TMI containing copolymer can also be dried and baled after dewatering using conventional techniques.

Copolymers and terpolymers of TMI with diene monomers are generally elastomers or rubbers. Such polymers contain pendant isocyanate groups. For example, copolymers of butadiene and m-TMI wherein there has been 1,4 addition have the structural formula

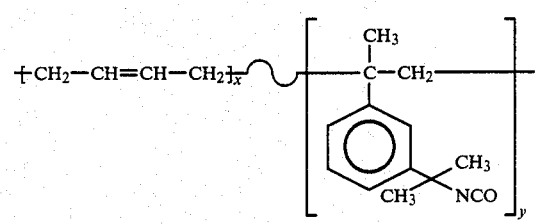

wherein indicates that the repeat units derived from butadiene and m-TMI can be in any order. Conventional compounding ingredients such as carbon black, fillers, oils, waxes, antioxidants, and other processing aids can be added to elastomeric copolymers of TMI and diene monomers. The properties of vulcanized rubbers of this type depend to a great extent upon what vulcanization systems are used in their compounding. Standard vulcanization systems which utilize sulfur or a sulfur compound can be utilized in vulcanizing such elastomers. Additionally, copolymers and terpolymers of TMI and diene monomers can be crosslinked (cured) using nonsulfur curing agents. However, in order for such polymers to be cured using nonsulfur curing agents, they must contain at least some unreacted isocyanate groups. Thus, if the nonsulfur curing of a TMI containing copolymer is contemplated it should not be treated with secondary amines or any other agents that will block its isocyanate groups. Such elastomeric copolymers can be crosslinked by utilizing difunctional or polyfunctional active hydrogen compounds. The active hydrogen compounds that can be utilized will contain 2 or more functional groups that are reactive toward isocyanate groups. It is generally preferred to cure the elastomers of this invention with dihydroxy alcohols, diamines, or dimercaptans. The use of dihydroxy alcohols to cure such elastomers results in their polymer chains being crosslinked with urethane linkages. More specifically, the isocyanate groups on the polymer chains react with the dihydroxy alcohol which reacts with another pendant isocyanate group on an adjacent polymer chain. A crosslink of this type between two adjacent polymer chains which were crosslinked with ethylene glycol can be represented by the formula:

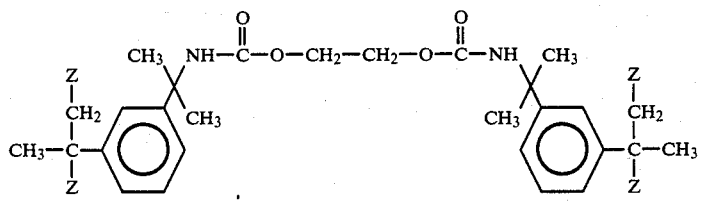

wherein Z represents a continuation of the polymer chain. The conditions used for such nonsulfur curing reactions will depend on the nonsulfur curing agent being used. In some cases, it will be desirable to utilize heat and/or a catalyst in order to facilitate the crosslinking reaction.

The use of difunctional or polyfunctional active hydrogen compounds as nonsulfur curing agents is of greatest value for use in elastomers which are difficult or impossible to cure with sulfur. Polychloroprene is such an elastomer which is very difficult to cure with sulfur or sulfur compounds. The incorporation of a small amount of TMI into the monomer charge composition used in the emulsion polymerization of chloroprene results in the formation of a copolymer of TMI and chloroprene. Such copolymers can be made so as to have a low degree of intermolecular crosslinking by utilizing the process for the emulsion copolymerization of TMI with dienes described herein. Normally from 1 to 5 weight percent of the repeat units in such copolymers of TMI and chloroprene will be derived from TMI with 95 to 99 weight percent of the repeat units in the copolymer being derived from chloroprene. Copolymers of TMI and chloroprene of this type can be compounded and crosslinked by utilizing difunctional or polyfunctional active hydrogen compounds.

The following examples are merely for the purpose of illustration and are not to be regarded as limiting the scope of the invention or the manner in which it can be practiced. Unless specifically indicated otherwise, parts and percentages are given by weight.

EXAMPLE 1

An aqueous reaction medium was prepared by charging 13.2 g (grams) of butadiene, 5.8 g of acrylonitrile, 1 g of m-TMI, 0.5 g of potassium stearate, 0.04 g of trisodium phosphate ($Na_3PO_4.12H_2O$), 0.3 g of diisopropylxanthogen disulfide (DIXIE), 0.0156 g of paramenthane hydroperoxide, 0.0054 g of ferrous sulfate ($FeSO_4.7H_2O$), 0.0014 g of sulfuric acid, 0.02 g of tetrasodium(ethylenedinitrilo) tetraacetate, 0.005 g of sodium formaldehyde sulfoxylate, and 40 g of deionized water into a 4 ounce (118 ml) polymerization bottle equipped with a screw-on cap. The polymerization bottle was placed in a constant temperature bath at 10° C. for a period of 18 hours at which time it was determined that the polymerization had reached a conversion of 91 percent.

The latex that was formed was coagulated by pouring it into isopropyl alcohol. The polymer was extracted twice with warm isopropyl alcohol and water. It was then vacuum dried at 50° C. The polymer recovered was determined to contain by a titration method 4.3 percent bound TMI. Thus, 86 percent of the TMI monomer charged into the aqueous reaction medium was bound into the polymer. This terpolymer was also determined to be soluble in toluene.

This example clearly shows that it is possible to emulsion polymerize m-TMI into polymers containing TMI and diene monomers. It also proves that it is not necessary to "block" the isocyanate group on the m-TMI prior to carrying out such an emulsion polymerization. Infra-red analysis showed that the pendant isocyanate groups on the TMI had not been destroyed in the emulsion polymerization. Thus, these pendant isocyanate groups can be used as sites to which chemical agents can be bound to the polymer. Such polymers can also be crosslinked utilizing materials that do not contain sulfur, such as dihydroxyalcohols and diamines. More specifically, it has been determined that tetraethylenepentamine can be used to crosslink polymers of this type which renders them insoluble in toluene.

EXAMPLE 2

The procedure specified in Example 1 was repeated in this experiment except that the monomer charge composition contained 10 weight percent TMI, 24 weight percent acrylonitrile, and 66 weight percent butadiene. In other words, the charge composition utilized in this experiment contained twice as much TMI as was utilized in Example 1. In contrast to the polymerization carried out in Example 1, this polymerization was run for 17 hours at a temperature of 18° C. which resulted in a conversion of 86 percent. It was determined that the polymer produced contained 6.6 percent bound TMI. It was also determined that this polymer was soluble in toluene.

EXAMPLE 3

The procedure specified in Example 1 was also utilized in this experiment except that the monomer charge composition contained 15 percent TMI, 19 percent acrylonitrile, and 66 percent butadiene. Thus, the monomer charge utilized contained 3 g of m-TMI, 3.8 g of acrylonitrile, and 13.2 g of butadiene. However, the polymerization in this experiment was shortstopped at a conversion of 63 percent by the addition of a 0.5 percent aqueous solution of hydroquinone. It was determined that the polymer produced contained 11.4 weight percent TMI and was soluble in toluene.

EXAMPLE 4

The procedure specified in Example 2 was repeated except that 0.13 g of a mixed tertiary alkyl mercaptan was used as the chain transfer agent in place of the DIXIE. A 96% conversion was obtained with the copolymer produced containing about 9.3% bound TMI. However, the polymer produced was not soluble in methyl ethyl ketone.

EXAMPLE 5

The procedure specified in Example 4 was repeated except that no TMI was included in the monomer charge (the monomer charge contained 66% 1,3-butadiene and 34% acrylonitrile). A conversion of 99% was achieved and the polymer produced was soluble in methyl ethyl ketone.

EXAMPLE 6

The procedure specified in Example 4 was repeated except that the monomer charge contained 66 parts of 1,3-butadiene, 32 parts of acrylonitrile, and 2 parts of m-TMI. A conversion of 99% was attained, but the polymer produced was not soluble in methyl ethyl ketone. This experiment demonstrated that the presence of even low levels of m-TMI will cause polymer gelation when a conventional mercaptan chain transfer agent is employed.

EXAMPLE 7

In this experiment a terpolymer of butadiene, styrene, and m-TMI was synthesized by charging 1 g of m-TMI, 5.8 g of styrene, 13.2 g of butadiene, 78 g of water, 0.4 g of a fatty acid (Na/K neutralized), 0.88 of $K_3PO_4$, 0.03 g of sodium naphthalene sulfonate and 0.3 g of DIXIE into a polymerization bottle. The polymerization was started by charging a redox initiator system that contained 0.0006 g of $FeSO_4.7H_2O$, 0.0066 g of sodium formaldehyde sulfoxylate, 0.0016 g of the tetrasodium salt of EDTA, 0.0004 g of sulfuric acid, and 0.0036 g of p-menthane hydroperoxide into the polymerization bottle. The monomers in the aqueous reaction medium formed were allowed to polymerize for 60 hours at 10° C. with additional charges of the redox initiator system being charged into the reaction medium after 18, 26, and 43 hours of polymerization.

In this experiment a monomer conversion of 90% was achieved. The soluble terpolymer formed was derivatized and was determined by nuclear magnetic resonance (NMR) to contain 4.1% TMI, 23.4% styrene, and 72.5% butadiene.

EXAMPLE 8

The procedure specified in Example 7 was repeated in this experiment except that the redox initiator system utilized contained 0.008 g of $FeSO_4.7H_2O$, 0.0132 g of sodium formaldehyde sulfoxylate, 0.0032 g of the tetrasodium salt of EDTA, 0.008 g of sulfuric acid and 0.0072 g of p-menthane hydroperoxide. This experiment also differs from Example 7 in that only one additional shot of the redox system was charged into the aqueous reaction medium after about 16 hours of polymerization. The polymerization in this experiment was run for 40 hours at which time a monomer conversion of 72% had been achieved. The polymer produced was determined by NMR analysis to contain 5.3% TMI, 20.8% styrene, and 73.9% butadiene.

EXAMPLE 9

The experimental procedure described in Example 8 was repeated in this experiment except that the polymerization was run at 25° C. and that no additional charges of the redox initiator system were charged into the aqueous reaction medium after the initial charge. This polymerization resulted in a monomer conversion of only 46%. A comparison between this experiment and the experiments run in examples 7 and 8 reveals the advantage of incremental initiator addition in terpolymerizations of TMI, styrene, and butadiene. The polymer produced in this experiment was determined to contain 2.5% TMI, 14.2% styrene, and 83.3% butadiene.

EXAMPLE 10

An aqueous reaction medium was prepared by charging 400 g of water, 8 g of a fatty acid (Na/K neutralized), 1.76 g of $K_3Po_4$, 0.0072 g of $FeSO_4.7H_2O$, 0.08 g of sodium formaldehyde sulfoxylate, 0.02 g of the tetrasodium salt of EDTA, 0.004 g of sulfuric acid, 0.04 g of p-menthane hydroperoxide, 10 g of m-TMI, 58 g of styrene, 132 g of butadiene, and 3 g of $\alpha,\alpha,\alpha',\alpha'$ tetrabromo(m-xylene) into a polymerization bottle. The polymerization bottle was then placed in a constant temperature bath at a temperature of 10° C. for a period of 24 hours. This polymerization resulted in the formation of an ungelled polymer and the monomer conversion was 67%. This experiment shows that the brominated hydrocarbons can be successfully employed as the chain transfer agent in polymerizations of TMI with diene monomers.

EXAMPLE 11

An emulsion containing 4.5 g of N-phenyl-N'-(1,3-dimethylbutyl)-p-phenylenediamine (DBDA), 10 ml of tetrahydrofuran, and 1 g of a 5% aqueous potassium stearate solution was added to a 50 g sample of a latex having a solids content of 30% which was prepared by utilizing the procedure described in Example 2. The terpolymer of TMI, acrylonitrile, and butadiene in the latex used contained about 8.6 phr of TMI. A catalyst which consisted of 0.12 g of dibutyl tin dilaurate and triethylamine was then added to the combined emulsions. The mixture was rotated for 16 hours at ambient temperatures and was then treated with 2 ml of an aqueous shortstop solution which contained 0.05 g of sodium dimethyl dithiocarbamate and 0.008 g of N,N-diethyl hydroxylamine. The emulsion was then shaken and coagulated by pouring it into isopropyl alcohol. After extracting the coagulated rubber for 16 hours with refluxing methanol, the product was vacuum dried. The product was soluble in methyl ethyl ketone and it was determined by NMR analysis that the polymer contained 7.9 parts of bound DBDA. Fourteen days after the polymer gum was isolated it was found to be no longer soluble in methyl ethyl ketone.

EXAMPLE 12

An emulsion containing 75 parts of DBDA, 75 parts of toluene, 65 parts of water, and 85 parts of a 10% aqueous potassium stearate solution was added to the latex of a terpolymer of TMI, acrylonitrile, and butadiene which contained about 10% bound TMI. Dibutyl tin dilaurate and triethylamine were then added to the latex as a catalyst as in Example 11. However, one-tenth of an equivalent of dibutylamine, based on charged TMI, was added to the latex 2 hours before the shortstopping solution was added. After coagulation and extraction it was determined that the polymer gum produced contained 7.4% bound DBDA. The polymer was found to be soluble in methyl ethyl ketone 44 days later.

While certain representative embodiments and details have been shown for the purpose of illustrating the invention, it will be apparent to those skilled in this art that various changes and modifications can be made therein without departing from the scope of the invention.

What is claimed is:

1. A process for the emulsion copolymerization of TMI with diene monomers into TMI containing copolymers wherein said emulsion copolymerization is carried out in an aqueous medium comprising (a) at least about 1 weight percent TMI, based upon the total amount of monomers in the aqueous medium, (b) at least about 50 weight percent of at least one diene monomer, based upon the total amount of monomers in the aqueous medium, (c) an emulsifier, (d) a redox initiator system, (e) a brominated hydrocarbon chain transfer agent, and (f) water; and wherein said TMI containing copolymers have pendant isocyanate groups and a gel content of less than 5 percent by weight.

2. A process for the emulsion copolymerization of TMI with diene monomers into TMI containing copolymers wherein said emulsion copolymerization is carried out in an aqueous medium comprising (a) at least about 1 weight percent TMI, based upon the total amount of monomers in the aqueous medium, (b) at least about 50 weight percent of at least one diene monomer, based upon the total amount of monomers in the aqueous medium, (c) an emulsifier, (d) a redox initiator system, (e) diisopropylxanthogen disulfide, and (f) water; and wherein said TMI containing copolymers have pendant isocynate groups and a gel content of less than 5 percent by weight.

3. A process as specified in claim 1 wherein said diene monomer is selected from the group consisting of butadiene, isoprene, piperylene, and chloroprene.

4. A process as specified in claim 1 wherein said aqueous medium further comprises at least one vinyl aromatic monomer.

5. A process as specified in claim 4 wherein said vinyl aromatic monomer is styrene and wherein said diene monomer is butadiene.

6. A process as specified in claim 2 wherein said aqueous medium further comprises acrylonitrile and wherein said diene monomer is butadiene.

7. A process as specified in claim 1 wherein said aqueous medium is comprised of from 40 to 90 weight percent water, from 10 to 60 weight percent TMI and diene monomers, from 0.1 to 10 weight percent of said emulsifier, and an effective amount of said redox initiator system and said brominated hydrocarbon chain transfer agent.

8. A process as specified in claim 7 wherein said emulsion copolymerization is conducted at a temperature from about −20° C. to about 60° C.

9. A process as specified in claim 1 wherein said brominated hydrocarbon contains from 1 to 20 carbon atoms and contains at least one carbon atom which is bonded to at least 2 bromine atoms.

10. A process as specified in claim 1 wherein said brominated hydrocarbon is selected from the group consisting of carbon tetrabromide, bromoform, and hexabromoethane.

11. A process as specified in claim 9 wherein from 0.00001 to 0.5 weight percent of said brominated hydrocarbon is present in said aqueous medium based upon the total weight of the aqueous medium; and wherein said copolymerization is conducted at a temperature from about −20° C. to about 60° C.

12. A process as specified in claim 11 wherein said aqueous medium is comprised of from about 40 weight percent to 95 weight percent water, from about 5 weight percent to about 60 weight percent monomers, and from about 0.1 weight percent to about 10 weight percent emulsifiers, based upon the total weight of the aqueous medium.

13. A process as specified in claim 12 wherein said aqueous medium further comprises at least one vinyl aromatic monomer.

14. A process as specified in claim 13 wherein said aqueous medium is comprised of from 50 to 90 weight percent diene monomers, from 1 to 30 weight percent TMI, and from 1 to 40 weight percent vinyl aromatic monomers, based upon the total amount of monomers in the aqueous medium.

15. A process as specified in claim 14 wherein said copolymerization is conducted at a temperature within the range of −5° C. to 40° C.; wherein said copolymerization is conducted for a period of time ranging from 0.5 hours to 50 hours; wherein said aqueous medium is comprised of from 50 to 90 weight percent water, 10 to 50 weight percent monomers, and 0.3 to 5 weight percent emulsifiers; wherein said brominated hydrocarbon is selected from the group consisting of carbon tetrabromide, bromoform and hexabromoethane; and wherein from 0.01 to 0.3 weight percent of said brominated hydrocarbon is present in the said aqueous medium based upon the total weight of the aqueous medium.

16. A process as specified in claim 15 wherein said diene monomer is selected from the group consisting of butadiene, isoprene, piperylene, and chloroprene; wherein said copolymerization is conducted at a temeprature within the range of 5° C. to 30° C.; wherein said copolymerization is conducted for a period of time within the range of 8 hours to 16 hours; and wherein said aqueous medium is comprised of from 60 to 80 weight percent water, 20 to 40 weight percent monomers, and 0.5 to 2 weight percent emulsifiers based upon the total weight of the aqueous medium.

17. A process as specified in claim 12 wherein said aqueous medium is comprised of from about 70 to 98 weight percent diene monomers and from 2 to 30 weight percent TMI, based upon the total amount of monomers in the aqueous medium; wherein said brominated hydrocarbon is selected from the group consisting of carbon tetrabromide, bromoform, and hexabromoethane; wherein from 0.01 to 0.3 weight percent of said brominated hydrocarbon is present in said aqueous medium based upon the total weight of the aqueous medium; wherein said vinyl aromatic monomer is styrene; and wherein said diene monomer is butadiene.

18. A process as specified in claim 2 wherein from 0.00001 to 0.5 weight percent of said diisopropylxanthogen disulfide is present in said aaueous medium based upon the total weight of the aqueous medium; and wherein said copolymerization is conducted at a temperature from about −20° C. to about 60° C.

19. A process as specified in claim 18 wherein said aqueous medium is comprised of from about 40 weight percent to 95 weight percent water, from about 5 weight percent to about 60 weight percent monomers, and from about 0.1 weight percent to about 10 weight percent emulsifiers, based upon the total weight of the aqueous medium; wherein said aqueous medium further comprises at least one vinyl aromatic monomer; and wherein said aqueous medium is comprised of from 50 to 99 weight percent diene monomers, from 1 to 30 weight percent TMI, and further 1 to 40 weight percent vinyl aromatic monomers, based upon the total amount of monomers in the aqueous medium.

20. A process as specified in claim 19 wherein said copolymerization is conducted at a temperature within the range of −5° C. to 40° C.; wherein said copolymerization is conducted for a period of time ranging from 0.5 hours to 50 hours; wherein said aqueous medium is comprised of from 50 to 90 weight percent water, 10 to 50 weight percent monomers, and 0.3 to 5 weight percent emulsifiers; and wherein from 0.01 to 0.3 weight percent of said diisopropylxanthogen disulfide is present in the said aqueous medium based upon the total weight of the aqueous medium.

21. A process as specified in claim 20 wherein said diene monomer is selected from the group consisting of butadiene, isoprene, piperylene, and chloroprene; wherein said copolymerization is conducted at a temperature within the range of 5° C. to 30° C.; wherein said copolymerization is conducted for a period of time within the range of 8 hours to 16 hours; and wherein said aqueous medium is comprised of from 60 to 80 weight percent water, 20 to 40 weight percent monomers, and 0.5 to 2 weight percent emulsifiers based upon the total weight of the aqueous medium.

22. A process as specified in claim 12 wherein said aqueous medium is comprised of from about 70 to 98 weight percent diene monomers and from about 2 to 30 weight percent TMI, based upon the total amount of monomers in the aqueous medium.

23. A process as specified in claim 18 wherein said aqueous medium is comprised of from about 70 to 98 weight percent diene monomers and from about 2 to 30 weight percent TMI, based upon the total amount of monomers in the aqueous medium.

* * * * *